Jan. 27, 1931.  C. N. CORYELL  1,790,263
HOLDER FOR STICK MATERIAL
Filed July 14, 1927

INVENTOR
CHARLES N. CORYELL
BY
Albert M. Austin
ATTORNEY

Patented Jan. 27, 1931

1,790,263

UNITED STATES PATENT OFFICE

CHARLES N. CORYELL, OF MAMARONECK, NEW YORK

HOLDER FOR STICK MATERIAL

Application filed July 14, 1927. Serial No. 205,609.

The invention relates in general to containers and, more particularly, to a container for holding and dispensing stick material.

According to the invention, a container is provided comprising a holder tube having a slot in its side wall and a carrier member telescoping in the holder tube, the carrier member having a finger projection in the slot. A cover member is detachably and permanently connected to the holder tube and acts preferably to close both the open end of the holder tube and the slot. In addition, the cover member may also serve to hold the carrier member in fully retracted position.

The invention is especially adapted for holding and dispensing stick material such as a lipstick but may also be made for holding other articles, such as combs, shaving brushes, etc. The operation of the device is independent of the cross section thereof so that any desired cross section may be used. Furthermore, the device is arranged so that the carrier member may be advanced and retracted separately from the operation of the cover member and parts are held in permanent assembled relation so that they cannot become separated or lost.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is an outside elevation of one form of the invention.

Figure 1:
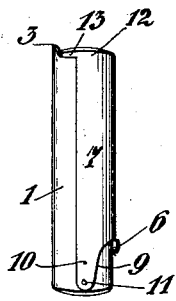
Figure 2:
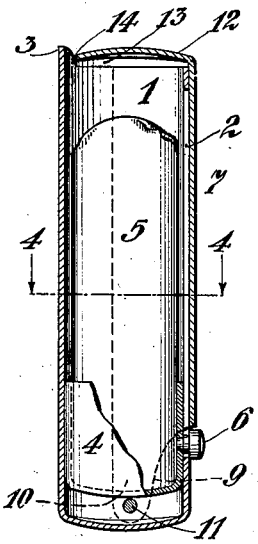
Fig. 2 is a longitudinal cross section of the device shown in Fig. 1, the parts being shown in closed relation.

In the following description and in the claims, the various parts of the apparatus and details of the invention will be identified by specific names for convenience, but they are intended to be as generic in their application as the art will permit.

Like reference characters denote like parts in the several figures of the drawings.

Referring now to the drawing and more particularly to Figs. 1 to 5, the holder or container comprises a holder tube 1 having an open top, a closed bottom and a slot 2 in its side wall. The upper edge of the wall of the holder tube has a finger piece 3 at one side thereof.

Telescopically mounted within the holder tube is a carrier tube 4 having a closed bottom and adapted to seat the stick material which may be a lipstick 5. A finger-engaging projection 6 is secured to the carrier tube 4 and projects out through the slot 2 so that it may be engaged by the finger to advance and retract the lipstick in use.

Pivotally connected at the lower end of the holder tube 1 is a cover member 7, said cover member comprising a generally semicylindrical skirt 8 extending a little more than one half the way around the holder tube, the skirt having a notch 9 forming a pair of projecting arms 10. These arms engage the outside of the holder tube and are pivoted thereto by a pin 11 passing through the arms and through the holder tube. At the upper end of the skirt is a cap 12, the cap having a closed upper end and a depending lip 13 extending between the edges of the skirt. The lip is interrupted and the cap is cut away forming the notch 14 to accommodate the finger piece 3.

The skirt 8 is curved in cross section preferably to fit the holder tube so as to have yielding engagement therewith to act as a catch to hold the cover member in closed position. The depending lip 13 may also have yielding engagement with the upper edge of the holder tube to act as a catch to hold the cover member in closed position. The skirt 8 overlies the slot 2 when in closed position, the notch 9 forming a clearance space for the finger projection 6 and operating to hold the carrier member in retracted position.

Figure 3:
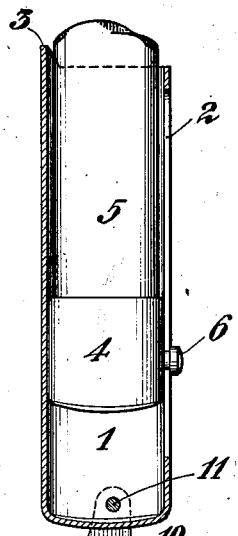
Fig. 3 is a longitudinal cross section of the device shown in Figs. 1 and 2, the parts being shown in open relation and the stick material being partially advanced for use.
Figure 4:
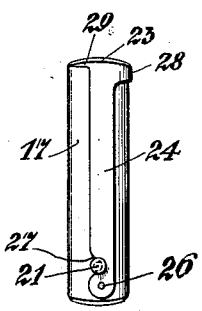
Fig. 4 is a cross section on the line 4—4 of Fig. 2.
Figure 5:
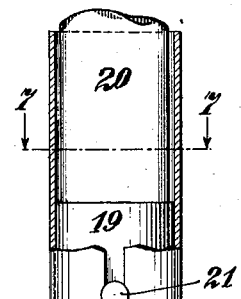
Fig. 5 is a top view of the device.

In operation, when it is desired to use the stick material, the holder may be opened by swinging the cover member laterally of the holder tube about the pivot pin, to the position shown in Fig. 3, the finger piece 3 aiding the separation of the cover member and holder tube. The carrier member may then be advanced to usable position as shown in Fig. 3 by engaging the finger with the projection 6. In closing, the carrier member is retracted and the cover member is swung to closed position. The spring engagement of the curved skirt with the holder tube and the spring engagement of the lip 13 and edge of the holder tube operate to hold the cover member in closed position.

Figure 6:
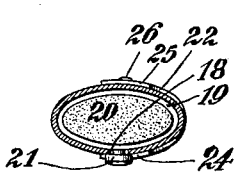
Fig. 6 is an outside elevation of a modification of the invention.
Figure 7:
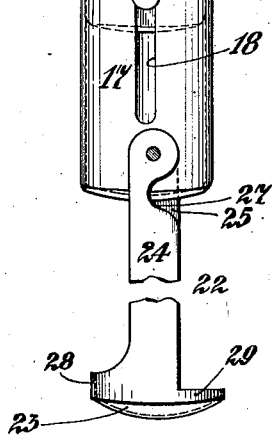
Fig. 7 is an enlarged view of the device shown in Fig. 6, parts being broken away, the cover being shown in open position and the stick material partially advanced for use.
Figure 8:
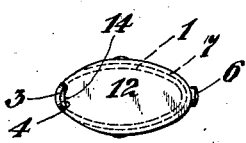
Fig. 8 is a section on the line 7—7 of Fig. 7.

Referring now to Figs. 6 to 8, the holder comprises a holder tube 17 having a closed bottom, an open top and a single slot 18 in its side wall. Telescopically mounted within the holder tube is a carrier tube 19 having a closed bottom and adapted to seat the lipstick 20, the carrier tube having a projection 21 extending out through the slot 18 and adapted to be engaged by the finger to advance and retract the lipstick.

Pivotally connected to the lower end of the holder tube is a cover member 22 comprising a cap 23 having a pair of oppositely disposed arms 24 and 25. A pin 26 passes through the lower ends of the arms and through the lower end of the holder tube to pivotally connect the cover member to the holder tube.

The arms overlie the outside of the holder tube when in closed position and one of the arms 24 acts as a cover for the slot 18. This arm has a notch 27 near the bottom to provide clearance for the projection 21 when the cover member is in closed position, this notch serving to hold and lock the carrier member in its fully retracted position. The arms are curved in cross section to fit the holder tube and the engagement of the arms with the holder tube may be yielding to aid in holding the cover member in closed position.

The cap 23 comprises a closed upper end and a depending side wall 28 connecting the arms on one side to limit the movement of the cover member when moved to closed position. A depending lip 29 connects the arms on the other side and has a yielding engagement with the top edge of the holder tube to aid in holding the cover member in closed position.

In operation, when it is desired to use the lipstick, the cover member is swung to the position shown in Fig. 7 and the projection is engaged by the finger to advance the lipstick for use. When it is desired to close the holder, the carrier member is retracted to its lower-most position and the cover member is swung to closed position. The yielding engagement of the laterally curved arms with the holder tube and the yielding engagement between the depending lip and the top of the holder tube operate to hold the cover member in closed position.

Thus it will be seen that a container has been provided which is of simple construction, inexpensive to manufacture and efficient in use. The parts are held in permanent assembled relation so that, when the cover member is moved to open position, the parts cannot be separated and lost. Furthermore, the separate means for advancing and retracting the stick material insures easy and positive action. The cover member operates to completely close the holder tube, preventing foreign material from contaminating the lipstick and also preventing the lipstick material from leaking out of the holder to soil the pocket or handbag of the user.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. A container comprising a holder tube having a longitudinal slot in its side wall and a finger piece at the edge of its open end, a carrier member telescoping within said holder tube and having a finger engaging projection extending out through said slot, a cover member comprising a skirt fitting and extending a little more than half around said tube and the greater part of the length thereof to cover said slot, said skirt having a notch forming arms, a pivot pin passing through said arms and the lower end of said tube, a cap having a depending lip having snap engagement with the upper edge of said tube and a notch to accommodate said finger piece.

2. A container comprising a holder tube having a longitudinal slot in its side wall, a carrier member telescoping within said holder tube, and having a finger engaging projection extending out through said slot, a cover member comprising a yieldable skirt fitting closely and extending just a little more than half around said tube the greater part of the length thereof to cover said slot, said skirt having a notch forming arms, and pivot means connecting said arms with the lower end of said holder tube, said finger-engaging projection being adapted to be engaged by the finger to move said carrier member, said skirt also operating as a catch to yieldably engage said holder tube to hold the container closed.

3. A container comprising a holder tube having a longitudinal slot in its side wall, a carrier member telescoping within said holder tube and having a finger engaging projection extending out through said slot, a cover member comprising a cap and an arm, pivot means connecting said holder tube and said arm independent of said carrier member, said cap being adapted to cover the open upper end of the holder tube, said arm being adapted to cover said slot.

4. A container comprising a holder shell having a slot in its wall, a carrier member within said holder shell and having a projection extending out thru said slot, a cover member, means directly connecting said holder shell and cover member independently of said carrier member, said cover member being adapted to close said slot, said cover member having a recess to accommodate said projection.

5. A container comprising a holder shell having a slot in its wall, a carrier member within said holder shell, means for operating said carrier member thru said slot, a cover member, means directly connecting said cover member to said holder shell independently of said carrier member, said cover member being adapted to overlie said slot.

6. A container comprising a holder shell having an open end and a slot in its wall, a carrier member slidably mounted within said holder shell having means for operating said carrier member through said slot, a cover member comprising a cap and an arm, said arm extending more than half way around said holder shell and extending from said cap substantially the entire length of said holder shell, means directly pivotally connecting the end of said holder shell opposite said open end and the end of said cover member opposite said cap independently of said carrier member, said cap being adapted to close said open end and said arm being adapted to close said slot.

In testimony whereof I have hereunto set my hand.

CHARLES N. CORYELL.